United States Patent [19]

Mizuno et al.

[11] Patent Number: 4,886,695
[45] Date of Patent: Dec. 12, 1989

[54] CERAMIC-METAL COMPOSITE BODIES

[75] Inventors: Takeyuki Mizuno, Toyohashi; Koji Kato, Nagoya, both of Japan

[73] Assignee: NGK Insulators, Ltd., Nagoya, Japan

[21] Appl. No.: 187,543

[22] Filed: Apr. 28, 1988

[30] Foreign Application Priority Data

May 11, 1987 [JP] Japan .............................. 62-68813[U]

[51] Int. Cl.⁴ .............................................. B32B 3/10
[52] U.S. Cl. ..................................... 428/137; 428/138; 428/220; 428/409; 428/457; 403/28; 403/29; 403/30; 403/273; 403/404
[58] Field of Search ...................... 403/28, 29, 30, 404, 403/273; 428/137, 138, 220, 409, 457

[56] References Cited

U.S. PATENT DOCUMENTS 4,614,453 9/1986 Tsuno et al. ........................ 403/30
4,690,617 9/1987 Oda et al. ............................ 403/30
4,697,325 10/1987 Kamigaito et al. .
4,722,630 2/1988 Fang .................................... 403/272
4,759,110 7/1988 Rieger et al. ....................... 403/273

FOREIGN PATENT DOCUMENTS 0197890 3/1986 European Pat. Off. .
0238321 3/1987 European Pat. Off. .
2734747 2/1979 Fed. Rep. of Germany .
3535511 4/1986 Fed. Rep. of Germany .

Primary Examiner—Thurman K. Page
Assistant Examiner—P. J. Ryan
Attorney, Agent, or Firm—Arnold, White & Durkee

[57] ABSTRACT

A ceramic-metal composite body is produced by fitting a protruding portion of a ceramic member into a concave portion of a metallic member. In this case, the protruding portion has a quantity of undulation in a plane including the axial line of the protruding portion of not more than 5 μm.

3 Claims, 1 Drawing Sheet

CERAMIC-METAL COMPOSITE BODIES

BACKGROUND OF THE INVENTION

1. Field of the Invention

This invention relates to ceramic-metal composite bodies.

2. Related Art Statement

As shown in FIG. 3, the conventional ceramic-metal composite body has hitherto been produced by fitting a protruding portion 22 of a ceramic member 21 into a concave portion 24 of a metallic member 23 through press fitting, shrinkage fitting, contraction fitting or the like.

In general, it is known that the fatigue of the metallic member frequently occurs and grows from the metal surface and also the life until fatigue failure becomes shorter as the stress produced in the metallic member is large. In the ceramic-metal composite body having such a structure that the protruding portion of the ceramic member is fitted into the concave portion or through-hole formed in the metallic member through press fitting, shrinkage fitting, contraction fitting or the like, the tensile stress always acts to the metallic member at the fitted portion between both members. Particularly, if undulation is existent in the protruding portion of the ceramic member, a larger tensile stress is locally caused in the concave portion of the metallic member, which is apt to easily cause fatigue failure.

In the conventional ceramic-metal composite body, therefore, considerable stress concentration is caused due to the undulation in a plane including the axial line of the protruding portion 22 of the ceramic member 21, at a peak of the undulation, particularly a peak existent in the fitted end of the protruding portion 22. As a result, the resistance to bending or torsion is weak, resulting in the failure of the composite body, so that the ceramic-metal composite body having a high reliability can not be obtained.

SUMMARY OF THE INVENTION

It is, therefore, an object of the invention to solve the aforementioned problems of the conventional technique and provide a ceramic-metal composite body capable of easily achieving the high reliability.

According to the invention, there is the provision of a ceramic-metal composite body produced by fitting a protruding portion of a ceramic member into a concave portion or a through-hole of a metallic member, characterized in that an outer surface of the protruding portion of the ceramic member has a quantity of undulation measured in a plane including the axial line of the protruding portion, of not more than 5 μm.

Here, the feature that the undulation quantity in the plane including the axial line is not more than 5 μm means that an arbitrary generator on a cylindrical face in the protruding portion of the ceramic member is existent between two parallel lines separated away from each other by 5 pm in a plane including the axial line of the cylinder.

In the above construction, the undulation quantity in the plane including the axial line of the protruding portion of the ceramic member is restricted to a predetermined range, whereby the stress concentration produced in the metallic member due to the undulation can be reduced as compared with the conventional case and consequently the ceramic-metal composite body having a high reliability can be obtained.

The reason why the undulation quantity in the plane including the axial line of the protruding portion is limited to not more than 5 μm is due to the fact that when the undulation quantity is more than 5 μm, stress concentration resulting from the undulation is remarkable and the cracking due to fatigue is produced to cause the failure of the metallic member as seen from the following examples.

BRIEF DESCRIPTION OF THE DRAWINGS

The invention will be described with reference to the accompanying drawings, wherein.

DESCRIPTION OF THE PREFERRED EMBODIMENTS

Figure 1:
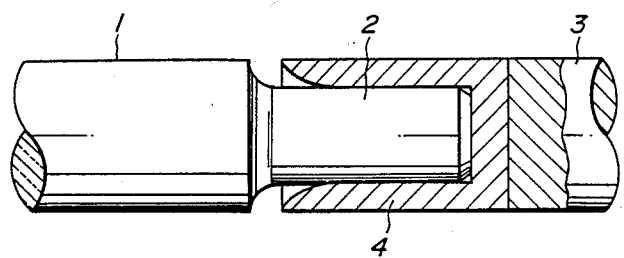
FIGS. 1 and 2 are schematic views partially shown in cross-section of some embodiments of the ceramic-metal composite body according to the invention.

In FIG. 1 is schematically shown a first embodiment of the ceramic-metal composite body according to the invention, wherein a protruding portion 2 is formed in an end of a ceramic member 1 and then fitted into a concave portion 4 of a metallic member 3. As the fitting method, the conventionally well-known press fitting, shrinkage fitting, contraction fitting or a combination thereof may preferably be used. In this case, it is necessary to restrict the undulation quantity in a plane including the axial line of the protruding portion 2 to not more than 5 μm. Moreover any materials may be used as a ceramic and a metal. Among them, silicon nitride, silicon carbide or sialon is favorable as the ceramic material, and a precipitation hardened alloy such as Incolloy (trade name), a heat resistant alloy or the like is favorable as the metal material.

The following examples are given in illustration of the invention and are not intended as limitations thereof.

EXAMPLE 1

Various ceramic-metal composite bodies were produced by providing a protruding portion 2 of a ceramic member 1 made from silicon nitride having an undulation quantity as shown in the following Table 1 and a diameter of 10.1 mm as partially shown in FIG. 1, and fitting it into a concave portion 4 of an intermediate member made from Fe-Ni alloy which was bonded to an end of a metal shaft 3 of SNCM 439 through friction welding and had an outer diameter of 12 mm and inner diameter of 10 mm.

The fitted part of the composite body was then heated to 400° C. and subjected to torsional torque, whereby a torque in the sliding between the protruding portion of the ceramic member and the concave portion of the intermediate member was measured. The scattering quantity of torque in the composite body to an average torque of ten composite bodies having the same undulation quantity was then measured according to the following equations. The results are also shown in Table 1.

$$\left(1 - \frac{\text{minimum torque of composite body}}{\text{average torque}}\right) \times 100$$

$$\left(\frac{\text{maximum torque of composite body}}{\text{average torque}} - 1\right) \times 100$$

TABLE 1

| Undulation quantity ($\mu$m) | 1 | 3 | 5 | 8 | 10 |
|---|---|---|---|---|---|
| Scattering quantity (%) | +14 / −12 | +16 / −16 | +12 / −16 | +21 / −17 | +26 / −24 |

As seen from the results of Table 1, ceramic metal composite bodies having a small scattering quantity and a high reliability are obtained when the undulation quantity is not more than 5 $\mu$m.

EXAMPLE 2

The same ceramic-metal composite bodies as in Example 1 were produced by the same method as in Example 1 and then subjected to a thermal fatigue test between liquid nitrogen temperature and room temperature. That is, this test was carried out by repeating 1,000 times a procedure that the composite body was placed in a liquid nitrogen and held for a certain time and then turned to room temperature. Thereafter, it was examined whether or not cracks occurred in the outer surface of the fitted part in the intermediate member. The results are shown in the following Table 2.

TABLE 2

| Undulation ($\mu$m) | 1 | 3 | 5 | 8 | 10 |
|---|---|---|---|---|---|
| Cracking | none occurred | none occurred | none occurred | Presence of micro cracks | Presence of micro cracks |

As seen from the results of Table 2, when the undulation quantity is not more than 5 $\mu$m, the composite body is durable to more than 1,000 times of thermal fatigue and has a sufficient resistance to thermal fatigue.

EXAMPLE 3

Figure 2:
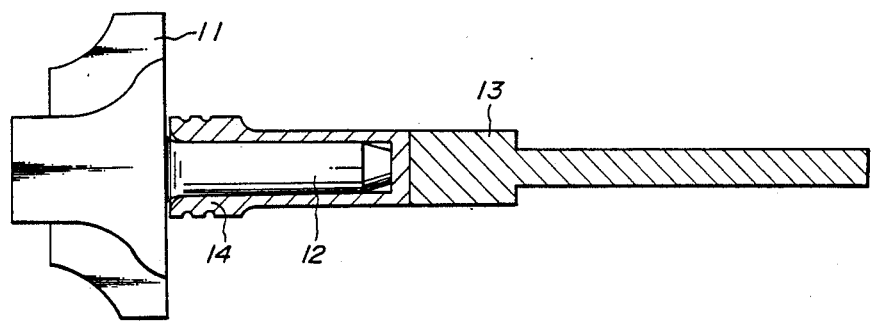
Figure 3:
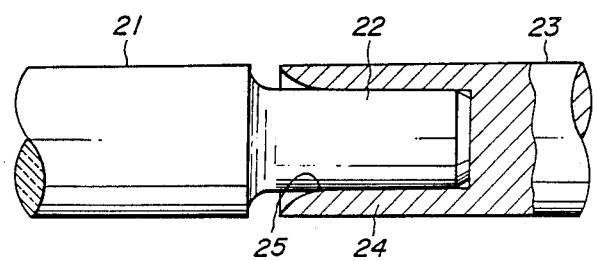
FIG. 3 is a schematic view partially shown in cross-section of the conventional ceramic-metal composite body.

A ceramic turbocharger rotor as shown in FIG. 2 was manufactured by fitting a protruding portion 12 of a ceramic rotor 11 made from silicon nitride into a concave portion of an intermediate member 14 made from Fe-Ni alloy and bonded to an end of a metal shaft 13 of SNCM 439 through friction welding. In this embodiment, the protruding portion 12 of the ceramic rotor 11 having an outer diameter of 10 mm and an undulation quantity of 2 $\mu$m was diameter fitted to the intermediate member 14 having an inner diameter of 9.93 mm and an outer diameter of 12.2 mm through press fitting.

The thus obtained ceramic turbocharger rotor was then assembled onto a high temperature rotation testing machine and subjected to a rotation test at a peripheral speed of 500 m/sec for 200 hours through a combustion gas of 900° C. As a result, there was observed no abnormal change in the outer surface of the fitted part in the intermediate member.

The invention is not limited to only the above examples, in that various modifications and changes may be applied thereto. For instance, the fitting between the protruding portion and the concave portion is carried out only at one-stage linear portion in the above examples, but such a fitting may be performed at two-stage consisting of large-diameter portion and small diameter portion. Furthermore, it is preferable that the undulation quantity in the inner peripheral surface of the metallic member to be fitted may be larger than that of the ceramic member when the metallic member is fitted through plastic deformation, and may be equal to or smaller than that of the ceramic member when the metallic member is fitted through elastic deformation. Moreover, the composite body according to the invention may preferably be applied to a rotational shaft in other gas turbine rotors and the like in addition to the aforementioned ceramic turbocharger rotor.

As mentioned above, in the ceramic-metal composite body according to the invention, the protruding portion of the ceramic member having the predetermined undulation quantity is fitted into the concave portion or through-hole of the metallic member, so that the stress concentration locally produced in the fitted part of the metallic member due to the undulation can be reduced and consequently ceramic-metal composite bodies having a high reliability can be obtained.

What is claimed is:

1. A ceramic-metal composite body produced by fitting a protruding portion of a ceramic member into a concave portion or a through-hole of a metallic member, wherein an outer surface of the protruding portion of the ceramic member has a quantity of undulation, measured in a plane including the axial line of the protruding portion, of not more than 5 $\mu$m.

2. The ceramic-metal composite body according to claim 1, wherein said fitting is performed through press fitting, shrinkage fitting, contraction fitting or a combination thereof.

3. The ceramic-metal composite body according to claim 1, wherein said composite body is used as a rotational shaft for a turbocharger rotor or a gas turbine rotor.

* * * * *